May 26, 1970 — C. WHEATLEY — 3,514,076
COMBINATION VALVE

Filed Dec. 18, 1967 — 4 Sheets-Sheet 1

CHARLES WHEATLEY
INVENTOR.

BY
*William S. Dorman*
ATTORNEY

May 26, 1970   C. WHEATLEY   3,514,076
COMBINATION VALVE

Filed Dec. 18, 1967   4 Sheets-Sheet 2

CHARLES WHEATLEY
INVENTOR.

BY
William S. Dorman
ATTORNEY

CHARLES WHEATLEY
INVENTOR.

BY William S. Dorman
ATTORNEY

United States Patent Office 3,514,076
Patented May 26, 1970

3,514,076
COMBINATION VALVE
Charles Wheatley, Tulsa, Okla., assignor to Charles Wheatley Company, Tulsa, Okla., a corporation of Oklahoma
Filed Dec. 18, 1967, Ser. No. 691,639
Int. Cl. F16k 15/03, 31/44
U.S. Cl. 251—261                                     9 Claims

ABSTRACT OF THE DISCLOSURE

A combination check valve and positive stop flow or plug valve wherein a single valve may be interposed in a flow line to provide the functions normally requiring two separate valves. The valve may be utilized for normal check valve operation to permit flow of fluid through the line in one direction while preventing back flow of the fluid. Alternately, the valve may be utilized as a positive stop flow or plug valve for closing down flow of fluid through the line in any direction until such time as it is desired that flow through the line be restored.

---

This invention relates to improvements in valves and more particularly, but not by way of limitation, to a combination check and positive stop flow or plug valve.

It is common practice to interpose check valves in a flow line wherein one directional flow through the line is required. As is well known, the check valve freely permits flow of the fluid in the desired direction therethrough, but automatically closes for precluding back flow of the fluid in the line. Of course, there are frequently conditions wherein it is desired or necessary to close down the flow line, such as for repair or the like, and at this time it is essential that all flow of fluid through the line be interrupted, or shut down. As a result, it is common practice to provide plug valves, or the like, in the line in conjunction with the check valves. There have been combination valves developed to provide the check valve operation and also the positive stop flow operation, such as shown in the C. C. Koplin Pat. No. 1,367,911, issued Feb. 8, 1921, and entitled "Stopcock and Check Valve." However, these valves have certain disadvantages in that fluid pressure may build up on the upstream side of the clapper or closure member to a sufficiently great force as to overcome the holding action of the clapper holding cam. When this condition exists, not only does fluid leakage occur, but the cam is frequently completely overcome, and the clapper member may open to provide free flow of fluid through the valve.

The present invention contemplates a novel combination valve of the aforementioned type wherein means is provided for snapping the holding cam member into a positive stop position against the back of the clapper or closure member. The holding cam is particularly designed and constructed to positively preclude any accidental opening of the valve from pressures acting on the closure member. In the hold down or positive closed position of the cam member, the pressure engagement of the cam against the clapper is positioned below the axis of rotation of the cam and thus engages the clapper in such a manner that pressure against the opposite face of the clapper can in no manner overcome the closing force of the cam thereagainst. The novel valve is simple and efficient in operation and economical and durable in construction.

It is an important object of this invention to provide a novel combination valve wherein normal check valve operation is provided alternately with a positive stop flow operation.

Another object of this invention is to provide a novel combination check valve-positive stop flow valve wherein the valve may be positive closed in such a manner as to substantially preclude accidental opening thereof due to internal pressures acting on the closure member.

Still another object of this invention is to provide a novel combination check valve-positive stop flow valve wherein the holding cam member is particularly designed can constructed for engagement with the closure member for substantially precluding accidental opening of the clapper member.

Other and further objects and advantageous features of the present invention will hereinafter more fully appear in connection with a detailed description of the drawings in which.

Figure 1:
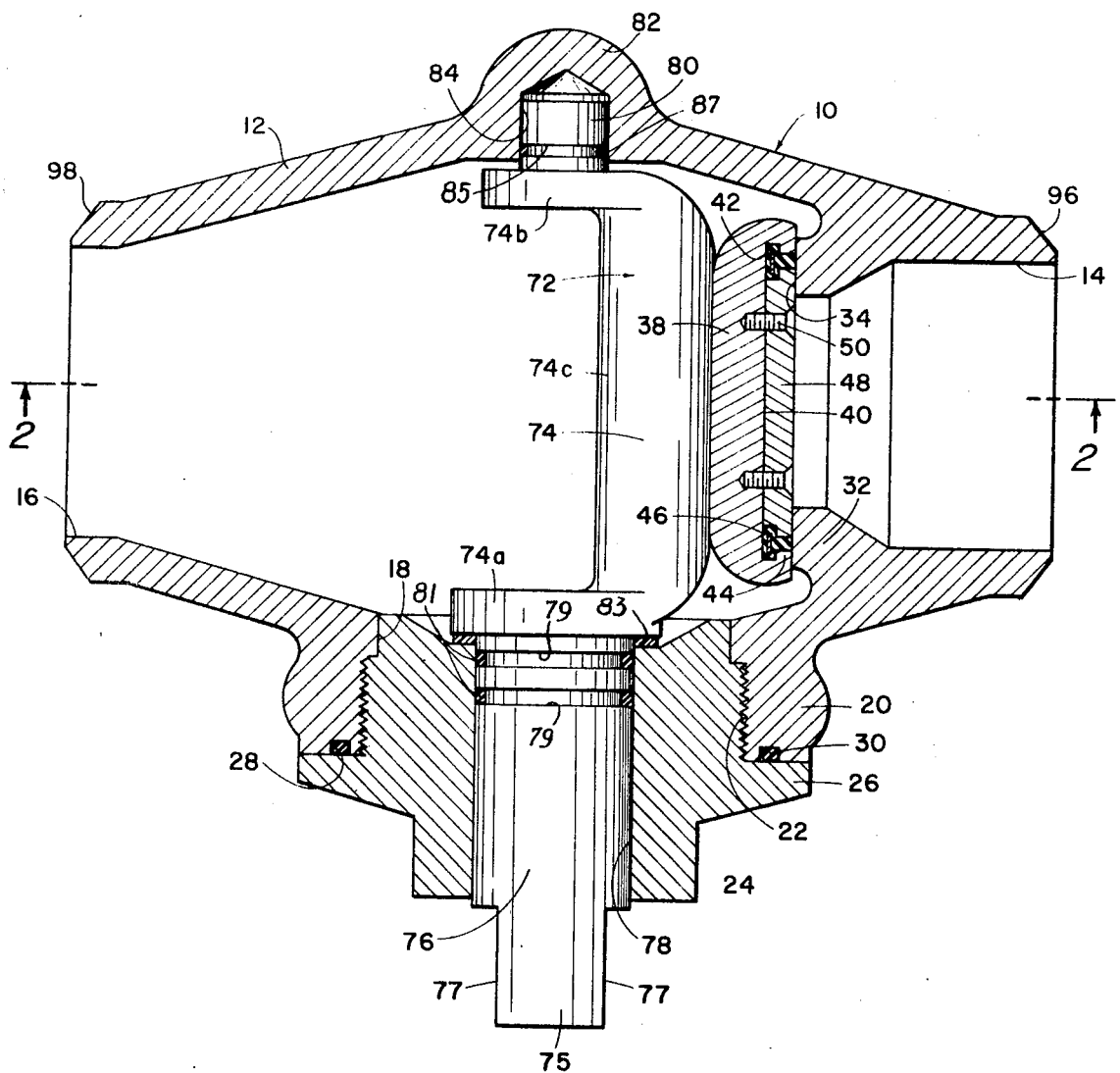
FIG. 1 is a sectional elevational view of a combination valve embodying the invention.

Referring to the drawings in detail, reference character 10 generally indicates a combination valve comprising an outer housing or body 12 having aligned inlet and outlet ports 14 and 16, respectively, providing for fluid flow through the body 12, as is well known. Since the port 14 is the inlet port and the port 16 is the outlet, the flow through the valve 10 as depicted herein is from right to left as viewed in FIG. 1. The body 12 is further provided with a substantially centrally disposed bore 18 formed by an outwardly extending circular flange 20 provided in the sidewall of the body 12, as viewed in FIG. 1. The flange member 20 is internally threaded at 22 for receiving a threaded bushing 24 therein for a purpose as will be hereinafter set forth. The bushing 24 is preferably provided with an outwardly extending shoulder 26 for disposition adjacent the outer surface of the flange 20. An annular groove 28 may be provided on the outer surface of the flange 20 for receiving an annular sealing member 30 to assure an adequate seal between the bushing member 24 and the flange 20 for substantially precluding leakage or accidental loss of fluid therebetween.

An inwardly directed annular flange 32 is provided within the valve body 12 conterminous with the inlet port 14. The inwardly directed end portion or face 34 of the flange 32 provides a seat for a circular substantially disc shaped clapper or closure member 36. The particular closure member 36 depicted in FIGS. 1 through 5 comprises a main disc portion 38 having the outer periphery thereof rounded or of substantially spherical configuration. The upstream face of the clapper disc 38 is provided with a substantially circular recess 40 having an undercut portion 42 extending around the circumference thereof to provide an inwardly directed annular shoulder 44 at the open edge of the recess 40. A flanged sealing member 46, similar to that disclosed in the Charles Wheatley Pat. No. 2,886,284, issued May 12, 1959, and entitled "Flanged Sealing Ring," is disposed in the recess 40 and undercut portion 42, and a flanged retaining disc 48 is removably secured in the recess 40 in any suitable manner, such as by a plurality of screws 50, for cooperation with the flange 44 to retain the sealing member 46 in position. The sealing member 46 engages the valve seat 34 in the closed position of the clapper member 36 to assure an adequate and efficient seal therebetween.

Figure 3:
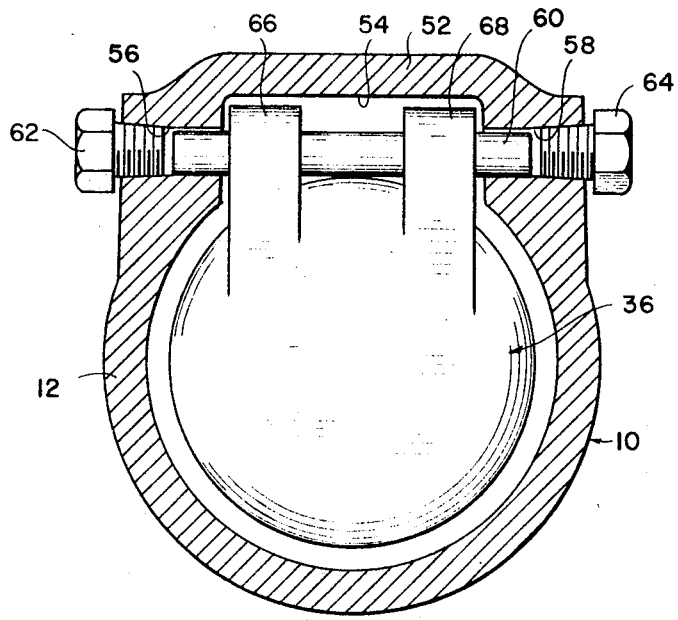
FIG. 3 is a sectional elevational view taken on line 3—3 of FIG. 2.
Figure 2:
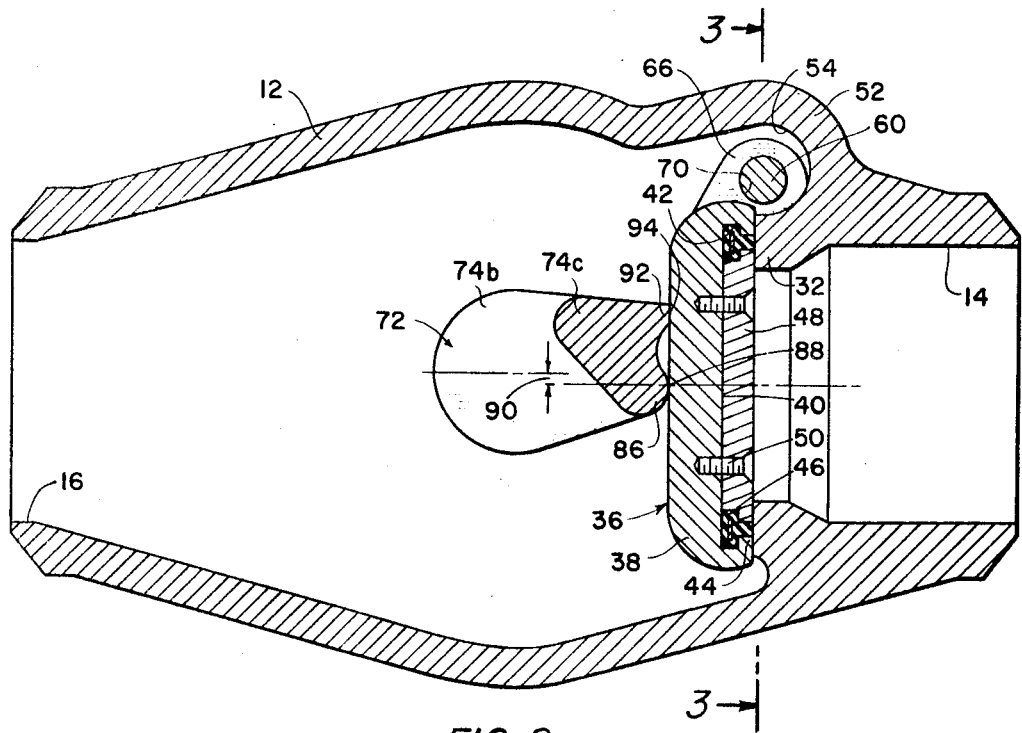
FIG. 2 is a sectional elevational view taken on line 2—2 of FIG. 1.

Referring particularly to FIGS. 2 and 3, the clapper member 36 is pivotally secured above the flange 32 to provide alternate positions of open and closed thereagainst, as is well known. The valve body 12 is provided with an outwardly extending bulge portion 52 which provides an internal cavity or recess 54 therein. A pair of aligned bores 56 and 58 (FIG. 3) are provided in the opposed side walls of the bulge 52 for receiving a pivot shaft 60. The shaft 60 extends through the chamber 54, and the opposite ends thereof are retained within the bores 56 and 58 by suitable retaining pins or bolts 62 and 64, respectively.

The clapper member 36 is provided with a pair of spaced upwardly extending angled shank members 66 and 68 having aligned apertures or bores 70 (FIG. 2) extending therethrough for receiving the pivot shaft 60 therein whereby the clapper member 36 is journaled for rotation about the shaft 60. Of course, recesses or cut-away portions (not shown) are provided in the cavity 54 to provide clearance for the shanks 66 and 68 in order that rotation of the clapper 36 will be unimpeded. The angled shape of the shank members 66 and 68 provides an off-center position of gravity for the pivot axis with respect to the clapper member 36, thereby constantly urging the clapper toward a closed position against the seating portion 34 for assuring an efficient operation of the valve under check valve operating conditions, as will be hereinafter set forth.

Whereas two of the shank members 66 ad 68 are depicted herein, it will be apparent that a single substantially centrally disposed shank may be utilized if desired, or any other desired number of connecting shanks.

A cam member generally indicated at 72 is journaled in the body 12 and spaced downstream from the clapper member 36. The cam member 72 comprises a substantially U-shaped central cam body 74 having a first pivot arm 76 extending outwardly therefrom and through a central aperture 78 provided in the bushing 24. A second pivot arm or pivot pin 80 extends from the body 74 in a direction opposite to the first arm 76 and in substantial axial alignment therewith. A second bulge or protrusion 82 is provided in the body 12 oppositely disposed from the flange 20 and forms it internal recess or bore 84 for receiving the pin 80 therein. The pivot arms 76 and 80 are journaled in the bushing 24 and bore 84, respectively, thus providing for rotation of the cam body 74 about the axis determined by the pivot arms 76 and 80. The pivot arms 76 and 80 extend outwardly from the spaced arms 74a and 74b of the U-shaped cam body 74, thus providing a cam-action against the downstream side of the clapper 36 when it is desired to maintain the clapper in a positive controlled closed position, as will be hereinafter set forth.

The outer extremity 75 of the arm 76 extends outwardly from the bushing 24 and may be either provided with a handle (not shown) or the usual "flats" 77 for receiving a wrench, or the like (not shown) in order that the arm 76 may be manually rotated from the exterior of the valve 10, as is well known. It is preferable to provide a plurality of spaced annular grooves 79 on the outer periphery of the arm 76 for receiving suitable sealing member 81 therein whereby rotation of the arm 76 is permitted while simultaneously precluding leakage of fluid between the arm 76 and bushing 24. In addition, suitable sealing means 83 may be interposed between the arm 74a and the bushing 24, as shown in FIG. 1, for precluding leakage of fluid therebetween. It is also preferable to provide an annular groove 85 on the outer periphery of the pivot arm 80 for receiving a suitable sealing member 87 therein whereby rotation of the pivot arm 84 is permitted, but leakage of fluid from the interior of the body 12 into the bore 84 is substantially precluded, thus reducing any trapping of fluid behind the pivot arm 80. Of course, it is to be understood that the sealing members 81 may be disposed in the bushing 24 rather than on the arm 76, if desired, and similarly, the sealing member 87 may be disposed in the valve body 12 rather than on the pivot arm 80, if desired.

The cross-sectional configuration of the cross bar portion 74c of the cam body 74 is particularly designed to provide a positive holding action in the closed position of the clapper and cam, as particularly shown in FIG. 2. The leading or outer edge of the cross bar 74c is provided with an arcuate or rounded projection member 86 having a leading most point or transversely extending line 88 which engages the rear or downstream face of the clapper 36 in the hold down position of the valve 10. The line or position 88 is located slightly off-set or slightly below the central axis of the pivot arms 76 and 80 as shown at 90 in FIG. 2. A second protrusion member 92 is provided on the leading face or edge of the cross bar 74c and is spaced from the rounded projection 86. The foreportion of the projection 92 is substantially flat and functions as a stop for limiting the clockwise rotation of the cam 72 as viewed in the drawings, and as will be hereinafter set forth in detail.

The valve 10 is adapted to be interposed in a flow line (not shown) with the inlet and outlet ports 14 and 16 in communication with the interior of the flow line. As shown in FIG. 1, the embodiment depicted herein is provided with an annular beveled portion extending around the outer circumference of the body 12 at the inlet end thereof, and a similar annular beveled portion 98 is provided around the outer circumference of the body 12 at the outlet end thereof. This is commonly known as a weld-end type construction whereby the valve may be interposed in the line by a suitable welding operation. However, it is to be noted that the usual coupling flanges (not shown) may be provided at the inlet and outlet ends of the body 12 in order that the valve may be interposed in the flow line by means of bolts, or the like (not shown).

OPERATION

Figure 5:
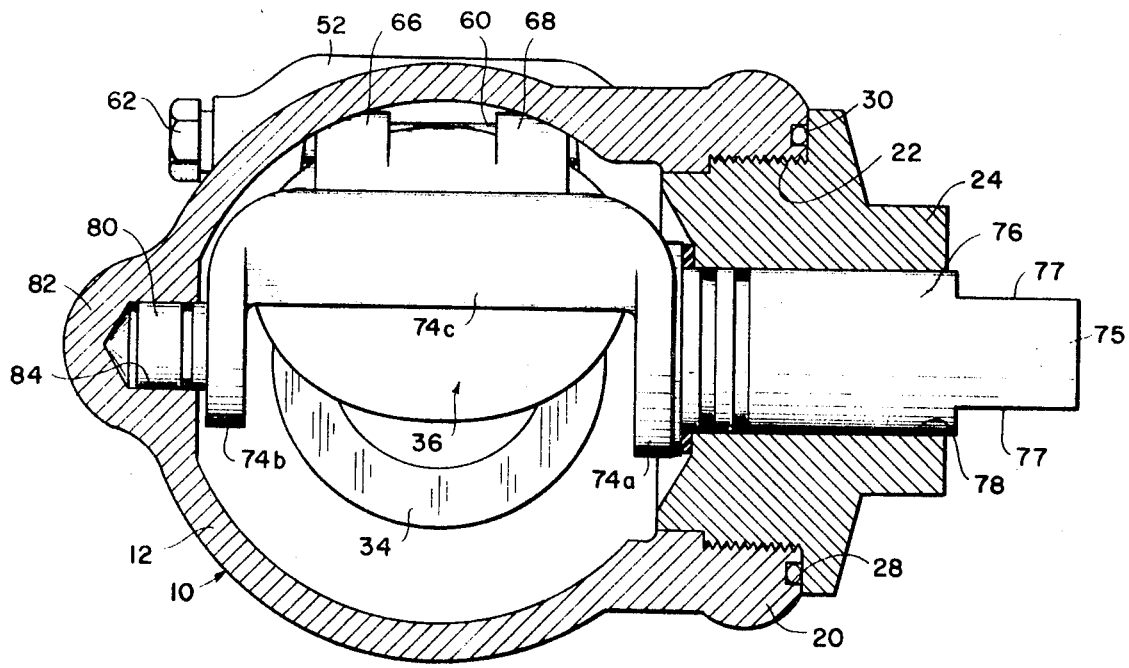
FIG. 5 is a sectional elevational view taken on line 5—5 of FIG. 4.
Figure 4:
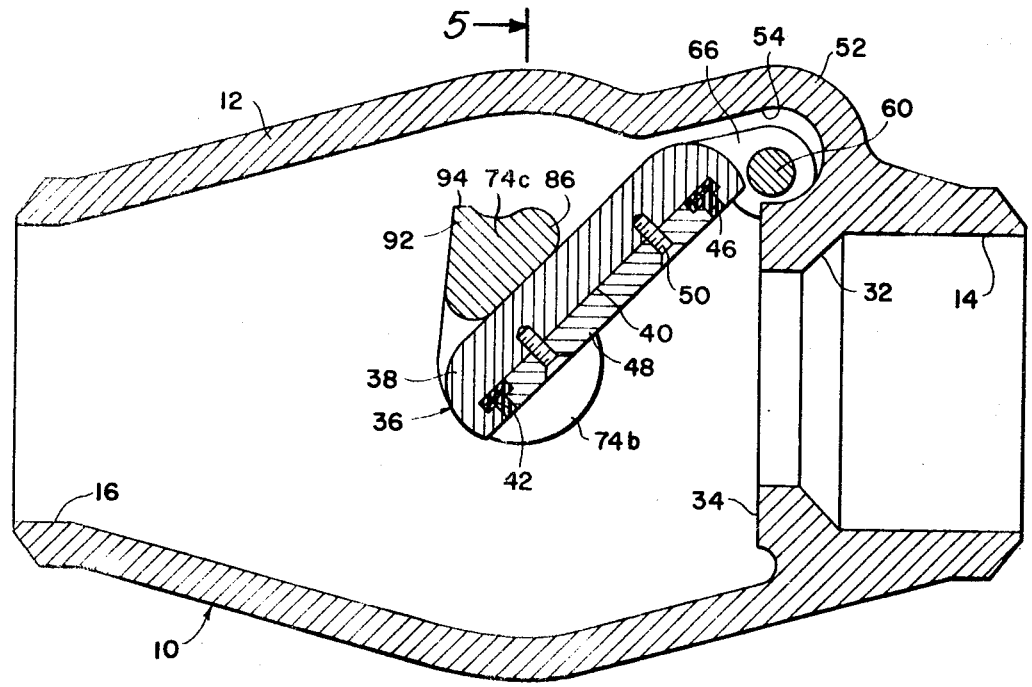
FIG. 4 is a view similar to FIG. 2 depicting the valve in an open position.

The valve 10 may be interposed in a flow line (not shown) in any suitable manner, as hereinbefore set forth, whereby the flow of fluid through the valve is in a direction from right to left, as viewed in FIG. 1. As long as the flow of fluid through the line is to continue in the usual uninterrupted manner, the pivot arm 76 may be manually rotated within the bushing 24 to such a position that the cross bar 74c of the cam 72 is in a raised or uppermost position, as shown in FIGS. 4 and 5. This permits the clapper 36 to pivot freely about the pivot shaft 60 to the open position thereof. The clapper will remain in the open position as long as the pressure against the upstream side thereof is sufficiently greater than the pressure against the upstream side thereof to overcome the weight of the clapper 36 against the seat portion 34. However, as soon as the pressure on the upstream side drops below this opening pressure, the clapper 36 will immediately move to the closed position thereof against the seat 34, as shown in FIGS. 2 and 3 for precluding any back flow of the fluid through the valve 10.

As hereinbefore set forth, the off-set position of the pivot shaft 60 causes the clapper to be constantly urged toward a closed position, thus increasing the speed of closing of the valve, and also increasing the efficiency of the sealing of the sealing member 46 against the valve seat 34. Of course, the pivoting of the clapper 38 in the opening direction is limited by the engagement of the flapper with the cross bar 74c, as shown in FIG. 4.

When it is desired to provide a positive closed position for the valve 10 for any reason, such as when the line below or downstream of the valve is to be repaired, or the like, the pivot arm 76 may be manually rotated in any well known manner, as hereinbefore set forth, for moving the cross bar 74c into engagement with the downstream face of the clapper 36. Of course, if the clapper is in the open position during the rotation of the arm 76, the engagement of the cross bar 74c with the clapper will move the clapper to the closed position against the valve seat 34. As the cam member 74 is rotated within the valve body 12 the rounded projection member 86 will initially engage the downstream side of the clapper 36. This urges the clapper 36 against the valve seat 34, and a continued rotation of the arm 76 will rotate the cam 74 further until the point or line 88 is against the back side of the clapper 36. Simultaneously, the flat portion 94 will engage the back face of the clapper 36, and further rotation of the cam member 74 in the closing direction will be limited or stopped. As a practical matter, subsequent to the initial closed and engaged position between the cam member 74 and the clapper 36, continued rotation of the cam will cause a snapping action as the cross bar 74c moves into the final or seal position against the clapper 36.

As hereinbefore set forth the point of contact 88 between the cross bar 74c and the clapper 36 is below the center line of the axis of rotation of the cam member, and when the cam member is in the hold-down position against the downstream face of the clapper member 36, the stop member 94 will also be in engagement with the clapper. Any pressure acting against the upstream side of the clapper will force the clapper against the cam and urge the cam in a clockwise rotational direction as viewed in the drawings. The stop member 94 positively precludes any further clockwise rotation of the cam and, consequently, no build-up of pressure on the upstream side of the clapper can in any manner cause the clapper to begin to open, or to dislodge the snap holding action of the cam member 74 against the clapper 36.

When the conditions for closing the valve 10 have been removed, and it is again desirable to return the flow of fluid through the valve 10, the arm 76 may be rotated for moving the cam 74 to the open or uppermost position thereof. It is preferable to provide mating or complementary stop members on the inner periphery of the valve body and on the outer periphery of the cam member 72 for limiting the movement of the cam member 72 in the opening direction. The cam will remain in the open position until the shaft 76 is again manually rotated for moving the cam to the closed position therefor.

Of course, suitable indicia may be provided on the exterior of the bushing 24 and the end portion 77 of the arm 76, if desired, in order that visual determination may be made from the exterior of the valve as to the internal position of the cam member.

MODIFICATION EMBODIMENT

Figure 7:
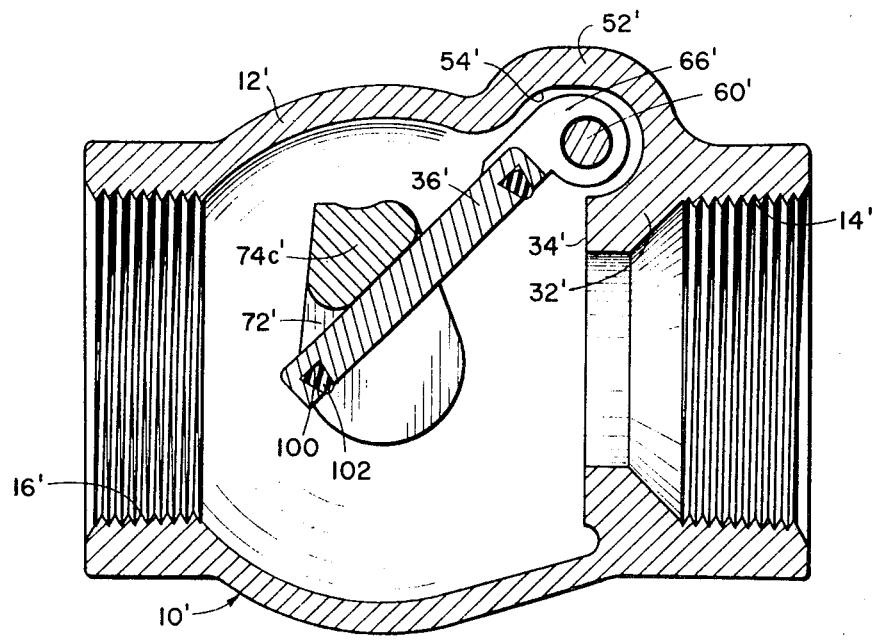
FIG. 7 is a view similar to FIG. 6 depicting the valve in an open position.
Figure 6:
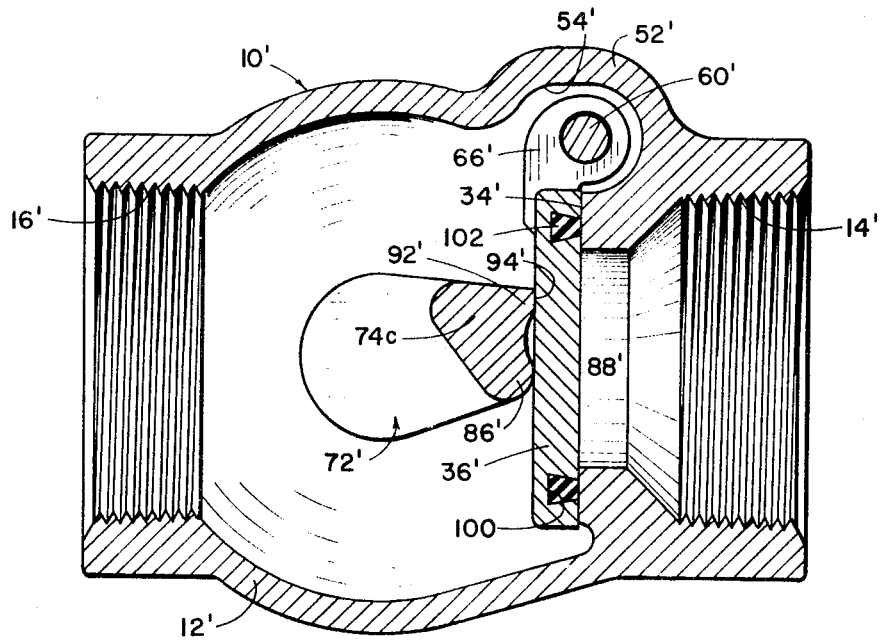
FIG. 6 is a sectional elevational view similar to FIG. 2 depicting a modified form of the invention.

Referring now to FIGS. 6 and 7, a modified form of the invention is depicted therein. The valve 10' is generally similar to the valve 10 and comprises a valve housing or body 12' having aligned inlet and outlet ports 14' and 16' respectively. The ports 14' and 16' are internally threaded for connection with the flow line through suitable well known couplings (not shown) instead of the welded type connection shown in FIGS. 1 through 5. An inwardly directed annular flange 32' similar to the flange 32 is provided within the valve body 12' conterminous with the inlet port 14'. The inwardly directed end portion 34' of the flange 32' provides a seat for a circular substantially disc shaped clapper member 36'. The clapper member 36' is provided with an annular groove 100 on the upstream face or side thereof for receiving a suitable annular sealing member 102 therein. The sidewalls of the groove 100 are preferably tapered, as particularly shown in FIG. 6, in such a manner that the bottom of the groove is of a slightly greater dimension than the open end thereof. The sealing member 102 is preferably provided with tapered sidewalls generally conforming with the configuration of the sidewalls of the groove 100, thus substantially precluding accidental loss of the seal 102 from the groove 100.

The valve body 12' is provided with an outwardly extending bulge 52' similar to the bulge 52, and which provides an internal cavity or recess 54' similar to the recess 54 and for the same purpose. A pivot shaft 60' is disposed in the cavity 54' in the manner similar to the shaft 60 in the recess 54. Further, the clapper 36' is provided with a pair of upwardly extending angled shank members 66' (only one of which is shown in FIG. 6 and 7, similar to the shank members 66 and 68, and journaled on the shaft 60' in the same manner as hereinbefore set forth in the first embodiment.

The valve 10' is provided with a cam member 72' identical with the cam member 72 in both construction and operation. The cross member 74c' of the cam 72' engages the downstream face of the clapper 36' in the same manner as hereinbefore set forth, with the projection member 86' in a final engagement therewith in such a manner that the engaging point or line 88' is spaced slightly below the pivot axis of the cam 72'. In addition, the flat projection 92' having the flat end 94' engages the downstream face of the clapper 36' for limiting the rotational movement of the cam 72' in the clockwise direction, as viewed in the drawings.

The operation of the valve 10' is substantially identical with that of the valve 10. In the normal check valve operation therefor, the cam member 72' is positioned in the uppermost or open position thereof, as shown in FIG. 7, and the clapper member 36' functions in the usual manner for permitting flow through the valve in one direction only. When it is desirable to positively preclude flow of fluid through the valve 10' in both directions, the cam member 72' is rotated to the closed position thereof as shown in FIG. 6. This efficiently retains the clapper in a closed position until such time as the cam member is moved away from the snap-closed position thereof.

From the foregoing it will be apparent that the present invention provides a novel combination valve wherein both a check valve operation and positive stop-flow valve operation may be provided in a single valve. The novel valve is provided with the usual pivotal clapper member which permits free flow of fluid through the valve in one direction and precludes flow of fluid in a reverse direction. In addition, a rotatable hold-down cam is provided for engagement with the clapper member to maintain a positive closed position thereof when it is necessary to preclude flow of fluid through the valve in both directions. The cam member is provided with a protrusion member for engaging the downstream face of the clapper member in a manner assuring a positive holding of the clapper as long as it is necessary to maintain a closed position for the valve. A stop member is provided on the cam member for cooperation with the protrusion member to assure no accidental opening of the valve upon pressure build up on the upstream side of the clapper member. The novel valve is simple and efficient in operation and economical and durable in construction.

Whereas the present invention has been described in particular relation to the drawings attached hereto, it should be understood that other and further modifications, apart from the those shown or suggested herein, may be made within the spirit and scope of this invention.

What is claimed is:

1. A combination valve comprising a housing having opposed inlet and outlet ports, a valve seat provided in the housing, closure means pivotally secured within the housing in the proximity of the valve seat and cooperating therewith to provide alternate closed and open positions for the valve, said closure means being responsive to fluid pressure from the upstream direction for opening the valve and responsive to fluid pressure from the downstream direction for closing the valve, rotatable cam means journalled in the housing downstream from the closure means and adapted for engagement with the closure means in one rotative position of the cam means to provide a positive hold-down position for the closure means against the valve seat, and stop means provided on the cam means for precluding accidental opening of the valve in the hold-down closed position thereof.

2. A combination valve as set forth in claim 1 wherein said cam means comprises a substantially U-shaped cam member journalled in the housing, projection means provided on the cam member for engaging the downstream side of the closure means, said projection means being spaced from said stop means for cooperating therewith to limit the rotation of the cam member in the hold-down direction to provide said positive hold-down position for the closure means against the valve seat.

3. A combination valve as set forth in claim 1 wherein said cam means includes an outwardly extending transverse projection member for engaging the downstream side of the closure means, said projection member being spaced from the axis of rotation of the cam and from the stop means to provide said positive hold-down position for the closure means against the valve seat and preclude accidental opening of the valve from pressure on the upstream side of the closure means.

4. A combination valve as set forth in claim 1 wherein the closure means comprises a substantially disc shaped body, seal means secured to the body for engagement with the valve seat, angled shank means provided on the body and extending outwardly therefrom, pivot shaft means disposed in the body above the valve seat, said shank means being journalled on the pivot shaft for rotation thereabout, and said pivot shaft being disposed offset with respect to the disc shaped body whereby the body is constantly urged in a direction toward the valve seat for increasing the efficient closing of the valve.

5. A combination valve as set forth in claim 4 wherein the cam means comprises a substantially U-shaped cam member journalled in the housing downstream from the disc shaped body, and a transversely extending projection member provided on the U-shaped cam member for engaging the downstream side of the disc shaped body.

6. A combination valve as set forth in claim 5 wherein said projection member is spaced from the axis of rotation of the cam means for cooperating with the stop means to provide said positive hold-down position for the closure means.

7. A combination valve as set forth in claim 6 wherein said U-shaped cam member is provided with oppositely disposed pivot arm members, at least one of said pivot arm members extending outwardly from said housing whereby said U-shaped cam member may be rotated within the housing.

8. In a combination check and positive stop valve having a pivotal clapper member and valve seat, a rotatable cam member comprising a bar member having a pair of oppositely disposed outwardly extending arm members, a pivot shaft member carried by each arm member for journalling the cam member in the valve downstream from the clapper member, at least one of said pivot shaft members extending outwardly from the valve wherein said cam member may be rotated within the valve, an outwardly projecting engaging member provided on the bar member for engaging the downstream side of the clapper member for urging the clapper member into sealing engagement with the valve seat in one rotational position of the cam member, and stop means provided on the bar for limiting the rotation of the cam member in the clapper engaging direction to provide a hold-down position for the clapper.

9. In a combination check and positive stop valve having a pivotal clapper member and valve seat, a rotatable cam member as set forth in claim 8 wherein said outwardly projecting engaging member is spaced from the axis of rotation of the cam member for cooperating with the stop means to preclude accidental opening of the clapper in the hold-down position from pressure against the upstream side of the clapper member.

References Cited

UNITED STATES PATENTS

| | | | |
|---|---|---|---|
| 446,059 | 2/1891 | Crawford | 251—298 |
| 1,367,911 | 2/1921 | Koplin | 251—82 |
| 1,725,428 | 8/1929 | Tilden | 251—303 X |
| 2,544,160 | 3/1951 | Hinrichs | 251—261 |
| 2,839,082 | 6/1958 | Moore et al. | 251—261 X |
| 2,934,309 | 4/1960 | Morser | 251—159 |
| 3,082,785 | 3/1963 | Radway | 251—82 |
| 3,084,904 | 4/1963 | McGay | 251—298 X |
| 3,334,858 | 8/1967 | Hay | 251—298 |
| 3,343,803 | 9/1967 | Burke | 251—163 |
| 3,358,709 | 12/1967 | Thresher et al. | 251—303 X |

FOREIGN PATENTS 872,906   4/1953   Germany.

WILLIAM F. O'DEA, Primary Examiner

D. R. MATTHEWS, Assistant Examiner

U.S. Cl. X.R.

137—527.8; 251—288, 298